United States Patent Office 3,010,995
Patented Nov. 28, 1961

3,010,995
ARYLOXY ACETIC ACID AMIDES
Franz Litvan and Willy G. Stoll, Basel, Switzerland, assignors to Geigy Chemical Corporation, Ardsley, N.Y., a corporation of Delaware
No Drawing. Filed July 13, 1959, Ser. No. 826,388
Claims priority, application Switzerland July 30, 1958
8 Claims. (Cl. 260—559)

The present invention is concerned with new aryloxy acetic acid amides which have valuable pharmacological properties and with a process for the production thereof.

It has been found that substituted aryloxy acetic acid amides corresponding to the general formula

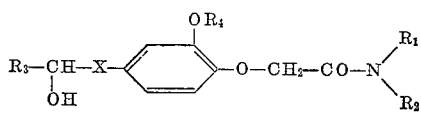

wherein $R_1$ represents a low molecular alkyl, a low molecular alkenyl or a cycloalkyl radical or a phenyl or benzyl radical which may be substituted by halogen atoms or by low molecular alkyl or alkoxy groups,
$R_2$ represents hydrogen or a low molecular alkyl or alkenyl radical,
$R_3$ represents an alkyl radical,
$R_4$ represents a low molecular alkyl radical, and
X represents the direct linkage or an ethylene or vinylene group —$CH_2$—$CH_2$— or —CH=CH—, respectively, whereby the alkyl radicals $R_1$ and $R_2$ can also be bound to each other direct or by way of an oxygen atom, have valuable pharmacological properties, in particular hypnotic and anaesthetic activity.

The compounds defined above can be produced by reducing a substituted aryloxy acetic acid amide of the general formula

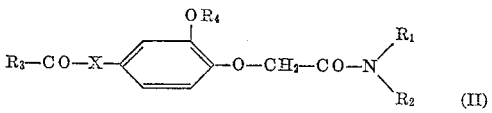

wherein $R_1$, $R_2$, $R_3$, $R_4$ and X have the meanings given above. A solution of aluminum isopropylate in isopropanol is particularly suitable as reducing agent, i.e. the reduction is performed according to Meerwein-Ponndorf. The reduction can also be carried out by means of sodium borohydride in a suitable organic solvent, e.g. in an anhydrous low molecular alkanol. Starting materials of the general Formula II are the methylamide, ethylamide, allyl amide, cyclohexylamide, benzylamide, anilide, o-toluidide, p-chloranilide, dimethylamide, diethylamide, di-n-propylamide, di-n-butylamide, di-n-amylamide, diallylamide, N-methyl-benzylamide, dibenzylamide, N-methyl anilide, N-ethyl anilide, N-n-propyl anilide, N-n-butyl anilide, N-allyl anilide, N-ethyl-o-toluidide, N-ethyl-p-toluidide, N-methyl-p-tert. butyl anilide, N-ethyl-p-chloranilide, N-ethyl-p-bromanilide, N-ethyl-p-anisidide, N-ethyl-p-phenetidide, pyrrolidide, piperidide and morpholide of 2-methoxy-4-acetyl phenoxy acetic acid, 2-methoxy-4-propionyl phenoxy acetic acid, 2-methoxy-4-butyryl phenoxy acetic acid, 2-methoxy-4-isobutyryl phenoxy acetic acid, 2-methoxy-4-valeryl phenoxy acetic acid, 2-methoxy-4-isovaleryl phenoxy acetic acid, 2-methoxy-4-caproyl phenoxy acetic acid, 2-methoxy-4-(butane-3'-onyl)-phenoxy acetic acid, 2-methoxy-4-($\Delta^{1.'2'}$-butene-3'-onyl)-phenoxy acetic acid, 2-ethoxy-4-acetyl phenoxy acetic acid, 2-ethoxy-4-propionyl phenoxy acetic acid and 2-ethoxy-4-n-butyryl phenoxy acetic acid. In their turn, these amides are obtained by reacting halogen acetamides of the general formula

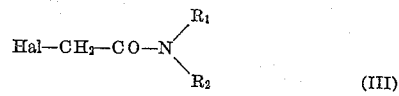

wherein Hal is a halogen atom and $R_1$ and $R_2$ have the meanings given above, with a substituted phenol of the general formula

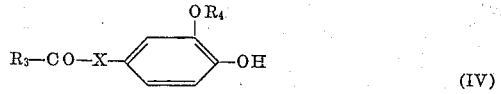

wherein $R_3$, $R_4$ and X have the meanings given above, in the presence of an acid binding agent, or with a salt of such a phenol, in particular with an alkali metal salt.

Starting materials of the general Formula II can also be obtained by reacting an aryloxy acetic acid of the general formula

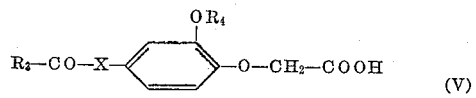

wherein $R_3$, $R_4$ and X have the meanings given above, or advantageously a reactive functional derivative of such an aryloxy acetic acid such as, e.g. a halide, a mixed anhydride, with a low aliphatic carboxylic acid, in particular acetic acid, or an ester, with a primary or secondary amine of the general formula

wherein $R_1$ and $R_2$ have the meanings given above.

In addition, starting materials of the general Formula II which have a disubstituted amide group are obtained if a carbaminyl chloride of the general formula

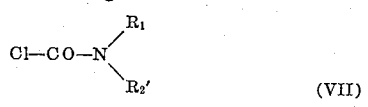

wherein $R_1$ has the meaning given above, and $R_2'$ has the meaning of $R_2$ above with the exception of hydrogen, is reacted in the warm with a salt of an aryloxy acetic acid of the general Formula V, in particular with an alkali metal salt. In this reaction the desired N,N-disubstituted amides are formed whilst the corresponding chlorides, e.g. alkali metal chlorides, separate and carbon dioxide is developed.

Suitable compounds of the general Formula V are, for example, the 2-alkoxy-4-alkanoyl phenoxy acetic acids, 2-alkoxy-4-alkanonyl phenoxy acetic acids or 2-alkoxy-4-alkenonyl phenoxy acetic acids (or their reactive functional derivatives), from which the amides of the general Formula II mentioned above are derived. Suitable amines of the general Formula VI are those from which the amides of the general Formula II are derived. Chlorocarbonyl derivatives of the secondary amines are suitable starting materials of the general Formula VII. Starting materials of the general Formula III are listed below, whilst, e.g., the phenols contained as ethers with glycolic acid amides in the compounds mentioned of the general Formula II are used as 2.4-disubstituted phenols of the general Formula IV.

Compounds defined above of the general Formula I can also be produced by reacting a halogen acetamide of the general Formula III given above with a substituted phenol of the general formula

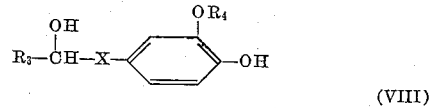

wherein $R_3$, $R_4$ and X have the meanings given above, in the presence of an acid binding agent, or reacting it with a salt of such a phenol, in particular with an alkali metal salt. Examples of amides of the general Formula III suitable for reaction are chloracetic acid and bromacetic acid methylamide, ethylamide, n-propylamide, isopropylamide, n-butylamide, isobutylamide, sec. butylamide, n-amylamide, isoamylamide, n-hexylamide, allylamide, methallylamide, cyclopentylamide, cyclohexylamide, cycloheptylamide, anilide, o-toluidide, m-toluidide, p-toluidide, benzylamide, dimethylamide, N-methylethylamide, diethylamide, N-methyl-n-propylamide, N-methyl-isopropylamide, di-n-propylamide, N-methyl-n-butylamide, N-methyl-isobutylamide, di-isobutylamide, N-methyl-allylamide, N-ethyl-allylamide, diallylamide, N-methyl-methallylamide, dimethallylamide, N-methyl-cyclohexylamide, N-methyl-benzylamide, dibenzylamide, pyrrolidide, piperidide, 2-methyl-piperidide, morpholide; and N-alkyl or N-alkenyl arylamides such as chloracetic acid and bromacetic acid, N-methyl, N-ethyl, N-n-propyl, N-isopropyl, N-n-butyl, N-isobutyl, N-sec. butyl, N-n-amyl, N-isoamyl, N-n-hexyl, N-allyl, N-crotyl and N-methallyl anilides, and corresponding o-toluidides, m-toluidides, p-toluidides, 3.4-dimethyl anilides, 2.4-dimethyl anilides, 2.5-dimethyl-anilides, 2.6-dimethyl anilides, mesidide, 4-ethyl anilides, 4-tert. butyl anilides, 2-chloranilides, 3-chloranilides, 4-chloranilides, 2.5-dichloranilides, 4-bromanilides, o-anisidides, m-anisidides, p-anisidides and p-phenetidides. Examples of phenols of the general Formula VIII which can be used are 2-methoxy-4-(1'-hydroxy-ethyl)-phenol, 2-methoxy-4-(1'-hydroxy-propyl)-phenol, 2-methoxy-4-(1'-hydroxy-n-butyl)-phenol, 2-methoxy-4-(1'-hydroxy-isobutyl)-phenol, 2-methoxy-4-(1'-hydroxy-n-amyl)-phenol, 2-methoxy-4-(1'-hydroxy-isoamyl)-phenol, 2-methoxy-4-(3'-hydroxy-butyl)-phenol, 2-methoxy-4-(3'-hydroxy-$\Delta^{1',2'}$-butenyl)-phenol, 2-ethoxy-4-(1'-hydroxy-ethyl)-phenol, 2-ethoxy-4-(1'-hydroxy-propyl)-phenol, 2-ethoxy-4-(1'-hydroxy-n-butyl)-phenol and 2-ethoxy-4-(1'-hydroxy-isoamyl)-phenol.

The compounds according to the present invention produce general anaesthesia when administered by intravenous injection, e.g. dissolved in aqueous propylene glycol. A great advantage is that they do not depress the respiratory centre. Such solutions can also be used for local anaesthesia and regional anaesthesia by subcutaneous or intramuscular injection, or for surface anaesthesia by instillation. In addition, the compounds according to the present invention can be used as hypnotics on peroral administration.

Of particular value are compounds of the general Formula I wherein $R_1$ represents a lower alkyl, allyl, cyclohexyl, phenyl, methylphenyl, methoxyphenyl, benzyl or chlorobenzyl radical, $R_2$ represents hydrogen, a lower alkyl or allyl radical, $R_1$ and $R_2$ taken jointly with the nitrogen atom represent the piperidino or morpholino radical, $R_3$ represents an alkyl radical having at most six carbon atoms, $R_4$ represents a methyl or ethyl radical and X represents the direct linkage or an ethylene or vinylene radical.

The following examples illustrate the production of the new compounds. Parts are given therein as parts by weight and their relationship to parts by volume is as that of grammes to cubic centimetres. The temperatures are given in degrees centigrade.

*Example 1*

29.3 parts of 2-methoxy-4-propionyl phenoxy acetic acid-N.N-diethylamide are refluxed with 100 ml. of a molar solution of aluminium isopropylate in abs. isopropyl alcohol. In this reaction the acetone formed is distilled off by moderately cooling the condenser in such a way that only the isopropyl alcohol returns to the reaction vessel. The distillation is continued until no acetone can be traced in the distillate. The excess isopropyl alcohol is then distilled off in a vacuum and diluted sulphuric acid is added to the residue while cooling with ice. The oil which separates is taken up in ether, the ethereal solution is repeatedly washed with diluted caustic soda lye and water, dried over sodium sulphate and the ether is distilled off. On distilling the residue in a high vacuum, an oil which boils at 150–160° under 0.002 mm. pressure is obtained which gradually solidifies. On crystallising from n-heptane, 2-methoxy-4-(1'-hydroxy-n-propyl)-phenoxy acetic acid-N.N-diethylamide is obtained. M.P. 65–66°.

If 32.1 parts of 2-methoxy-4-n-valeroyl phenoxy acetic acid-N.N-diethylamide are reduced under the conditions described, then an oil which boils at 170–175° under 0.0004 mm. pressure is obtained, from which, on crystallising from n-heptane, 2-methoxy-4-(1'-hydroxy-n-amyl)-phenoxy acetic acid-N.N-diethylamide can be obtained. M.P. 50–52°.

*Example 2*

3 parts of sodium borohydride are added in small portions over a period of several hours while stirring at 0–5° to a solution of 28 parts of 2-methoxy-4-acetyl phenoxy acetic acid-N.N-diethylamide in 150 parts of anhydrous methanol and the whole is stirred for about 12 hours in the cold. After this time, no more ketone can be traced with dinitrophenyl hydrazine reagent. The excess sodium borohydride is decomposed by the introduction of carbon dioxide and, at the same time, the carbinol formed is liberated. The methanol is distilled off on the water bath, water is added to the residue and the carbinol is taken up in chloroform. The chloroform solution is washed with water, dried over sodium sulphate and the solvent is distilled off. The residue which gradually becomes crystalline is crystallised from benzene/petroleum ether. It is 2-methoxy-4-(1'-hydroxy-ethyl)-phenoxy acetic acid-N.N-diethylamide which melts at 74–75°.

If 33.5 parts of 2-methoxy-4-n-caproyl phenoxy acetic acid-N.N-diethylamide are reduced under the conditions described above, then 2-methoxy-4-(1'-hydroxy-n-hexyl)-phenoxy acetic acid-N.N-diethylamide is obtained. M.P. 51–52° (from hexane).

2-methoxy-4-(3'-hydroxy-n-butyl)-phenoxy acetic acid-N.N-diethylamide, an oil which boils at 151–154° under 0.0001 mm. Hg pressure, is obtained in an analogous manner by reducing 31 parts of 2-methoxy-4-(3'-oxo-n-butyl)-phenoxy acetic acid-N.N-diethylamide.

Starting from 30 parts of 2-methoxy-4-acetyl phenoxy acetic acid-N.N-diallylamide, 2-methoxy-4-(1'-hydroxy-ethyl)-phenoxy acetic acid-N.N-diallylamide is obtained in an analogous manner. It is an oil which boils at 191–193° under 0.03 mm. Hg pressure.

Starting from 33.5 parts of 2-methoxy-4-acetyl phenoxy acetic acid-N.N-di-n-butylamide, 2-methoxy-4-(1'-hydroxy-ethyl)-phenoxy acetic acid-N.N-di-n-butylamide is obtained in an analogous manner. It is an oil which boils at 189–192° under 0.001 mm. Hg pressure.

Starting from 32 parts of 2-methoxy-4-acetyl phenoxy acetic acid-N-methyl-N-cyclohexylamide, 2-methoxy-4-(1'-hydroxy-ethyl)-phenoxy acetic acid-N-methyl-N-cyclohexylamide is obtained in an analogous manner. It is an oil which boils at 216–218° under 0.0015 mm. Hg pressure.

Starting from 29 parts of 2-methoxy-4-acetyl phenoxy acetic acid piperidide, 2-methoxy-4-(1'-hydroxy-ethyl)-phenoxy acetic acid piperidide is obtained in the same way. It is an oil which boils at 208–211° under 0.002 mm. Hg pressure.

Starting from 29 parts of 2-methoxy-4-acetyl phenoxy acetic acid morpholide, 2-methoxy-4-(1'-hydroxy-ethyl)-phenoxy acetic acid morpholide is obtained in the same way. It is an oil which boils at 191–192° under 0.03 mm. Hg pressure.

Starting from 30.5 parts of 2-ethoxy-4-propionyl phenoxy acetic acid-N.N-diethylamide, 2-ethoxy-4-(1'-hydroxy-propyl)-phenoxy acetic acid-N.N-diethylamide is obtained in an analogous manner; B.P.$_{0.0005}$ 159–160°, and Starting from 30.5 parts of 2-methoxy-4-(3'-oxo-n-buten(1')yl)-phenoxy acetic acid-N.N-diethylamide, 2-methoxy-4-(3'-hydroxy-n-buten(1')-yl)-phenoxy acetic acid-N.N-diethylamide is obtained in an analogous manner.

*Example 3*

3.7 parts of 2-methoxy-4-n-caproyl phenoxy acetic acid-p-toluidide are suspended in 80 parts of anhydrous methanol and, while stirring at 0–5°, excess sodium borohydride is added in small portions until no more ketone can be traced. About 1 part of $NaBH_4$ is necessary. The reduction takes about 5–6 hours. The clear solution obtained is then made weakly acid with diluted acetic acid and evaporated to dryness in the vacuum. Recrystallised from diluted methyl alcohol, 2-methoxy-4-(1'-hydroxy-n-hexyl)-phenoxy acetic acid-p-toluidide is obtained which melts at 106°.

2-methoxy-4-n-caproyl phenoxy acetic acid-p-anisidide can be reduced in the same way to 2-methoxy-4-(1'-hydroxy-n-hexyl)-phenoxy acetic acid-p-anisidide. Crystallised from diluted methanol, it melts at 118°.

2-methoxy-4-(1'-hydroxy-n-hexyl)-phenoxy acetic acid-N-methyl anilide can be produced by the same process from the corresponding ketone. It is a thick oil which boils at 213–215° under 0.0003 mm. Hg pressure.

2-methoxy-4-(1'-hydroxy-n-hexyl)-phenoxy acetic acid-N-benzylamide can be produced by the same process from the corresponding ketone. It boils at 183–186° under 0.0007 mm. Hg pressure and solidifies into crystals which melt at 86°.

2-methoxy-4-(1'-hydroxy-n-hexyl)-phenoxy acetic acid-N-ethyl-N-p-chlorobenzylamide can be produced by the same process from the corresponding ketone. It is a thick oil which boils at 199° under 0.0008 mm. Hg pressure.

What we claim is:

1. An aryloxy acetic acid amide of the formula

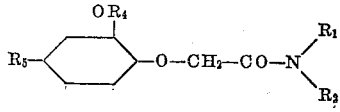

wherein $R_1$ represents a member selected from the group consisting of lower alkyl, lower alkenyl, cyclopentyl, cyclohexyl, cycloheptyl, phenyl, halogenphenyl, lower alkylphenyl, lower alkoxyphenyl, benzyl, halogenbenzyl, lower alkylbenzyl, and lower alkoxybenzyl, $R_2$ represents a member selected from the group consisting of hydrogen, lower alkyl and lower alkenyl, $R_1$ and $R_2$ taken jointly with the nitrogen atom represent a member selected from the group consisting of the pyrrolidino, piperidino and morpholino radical, $R_4$ represents lower alkyl, $R_5$ represents a member selected from the group consisting of

   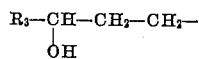

and

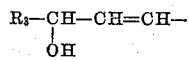

and $R_3$ represent alkyl having at most 6 carbon atoms.

2. 2-methoxy-4-(1'-hydroxy-n-propyl)-phenoxy acetic acid-N.N-diethylamide.

3. 2-methoxy-4-(1'-hydroxy-n-amyl)-phenoxy acetic acid-N.N-diethylamide.

4. 2-methoxy-4-(1'hydroxyethyl)-phenoxy acetic acid-N.N-diethylamine.

5. 2-methoxy-4-(1'-hydroxy-n-hexyl)-phenoxy acetic acid-N.N-diethylamide.

6. 2-methoxy-4-(3'-hydroxy-n-butyl)-phenoxy acetic acid-N.N-diethylamide.

7. 2-methoxy-4-(1'-hydroxy-ethyl)-phenoxy acetic acid-N.N-di-n-butylamide.

8. 2-ethoxy-4-(1'-hydroxy-propyl)-phenoxy acetic acid N.N-di-ethylamide.

No references cited.